US008040835B2

(12) United States Patent
Olson et al.

(10) Patent No.: US 8,040,835 B2
(45) Date of Patent: Oct. 18, 2011

(54) TROUBLESHOOTING LINK AND PROTOCOL IN A WIRELESS NETWORK

(75) Inventors: Timothy S. Olson, San Jose, CA (US); Jeevan Shashikant Patil, San Jose, CA (US); David Sheldon Stephenson, San Jose, CA (US); Robert B. O'Hara, Jr., Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 649 days.

(21) Appl. No.: 11/356,488

(22) Filed: Feb. 17, 2006

(65) Prior Publication Data

US 2007/0197206 A1    Aug. 23, 2007

(51) Int. Cl.
    *H04W 4/00*    (2009.01)
(52) U.S. Cl. ........ 370/328; 370/338; 370/241; 455/423; 455/67.11
(58) Field of Classification Search .......... 370/241, 370/328, 338; 455/423, 67.11, 115.1, 226.1
    See application file for complete search history.

(56) References Cited

U.S. PATENT DOCUMENTS

| 5,570,373 | A  | * | 10/1996 | Wing ........................ 455/423 |
|---|---|---|---|---|
| 6,760,582 | B2 |   | 7/2004 | Gaal |
| 7,251,685 | B1 | * | 7/2007 | Yildiz ........................ 709/221 |
| 2002/0072359 | A1 |   | 6/2002 | Moles et al. |
| 2003/0064719 | A1 |   | 4/2003 | Horne |
| 2004/0054774 | A1 |   | 3/2004 | Barber et al. |
| 2005/0130645 | A1 |   | 6/2005 | Dobson et al. |
| 2007/0026854 | A1 | * | 2/2007 | Nath et al. ........................ 455/423 |
| 2007/0049266 | A1 | * | 3/2007 | Voss ........................ 455/423 |

FOREIGN PATENT DOCUMENTS

CN    1240097    12/1999

OTHER PUBLICATIONS

Geier, *Troubleshooting your 802.11 WLAN*, www.wifiplanet.com/tutorials/article.php/953571, Jan. 11, 2002.
*Wireless Troubleshooting*, Microsoft TechNet, http://technet2.microsoft.com/WindowsServer/en/Library/ecc10b32-898a-435f-9d5c-01c25fb4d1f61033.mspx, updated Jan. 21, 2005.
"European Search Report"; European Patent Office; Munich, Germany, Nov. 18, 2010.
Chinese Office Action (State IPO of the Office of the People's Republic of China) for PCT Application No. 200780001667.1 (in Chinese National Phase); applicant: Cisco Technology, Inc.; "Troubleshooting Link and Protocol in a Wireless Network"; 12 pages (English and Chinese), Jun. 23, 2010.
Chinese Office Action (State IPO of the Office of the People's Republic of China) for PCT No. 200780001667.1 (in Chinese National Phase); applicant: Cisco Technology, Inc.; "Troubleshooting Link and Protocol in a Wireless Network"; 13 pages (English and Chinese), Dec. 21, 2010.

* cited by examiner

*Primary Examiner* — Nghi H Ly
(74) *Attorney, Agent, or Firm* — Baker Botts L.L.P.

(57) ABSTRACT

Methods, apparatuses, and systems directed to facilitating troubleshooting wireless connectivity issues in a wireless network. In accordance with one embodiment of the present invention, either a diagnostic supplicant in the wireless client or a diagnostic manager initiates a troubleshooting protocol between the diagnostic supplicant and the diagnostic manager over a diagnostic link in response to one or more events. In one embodiment, after the diagnostic supplicant establishes a link to a diagnostic manager via a diagnostic link, the diagnostic supplicant generates and transmits a problem report to the diagnostic manager. The problem report initiates a troubleshooting protocol between the diagnostic manager and the diagnostic supplicant.

17 Claims, 13 Drawing Sheets

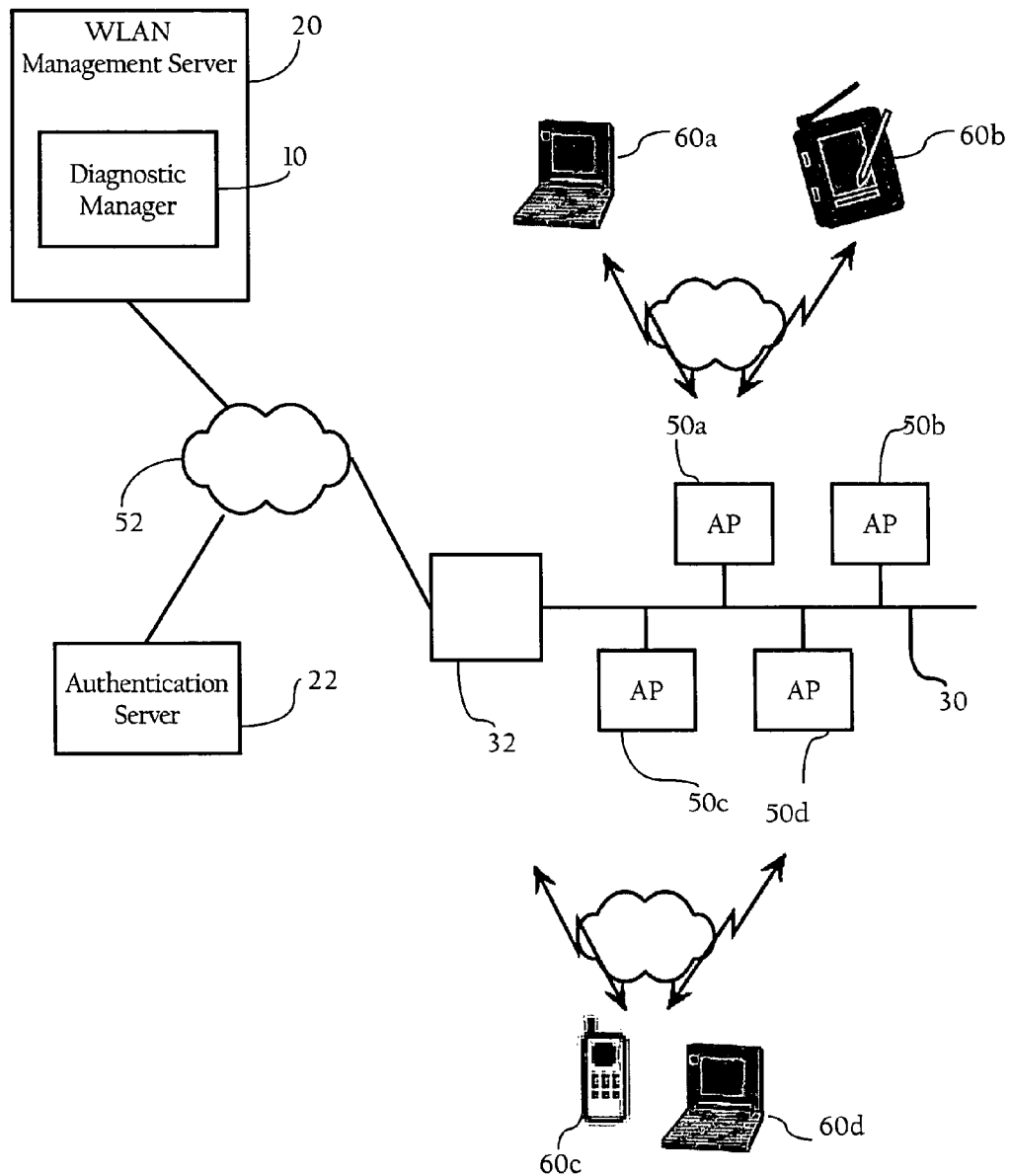
Fig._1A

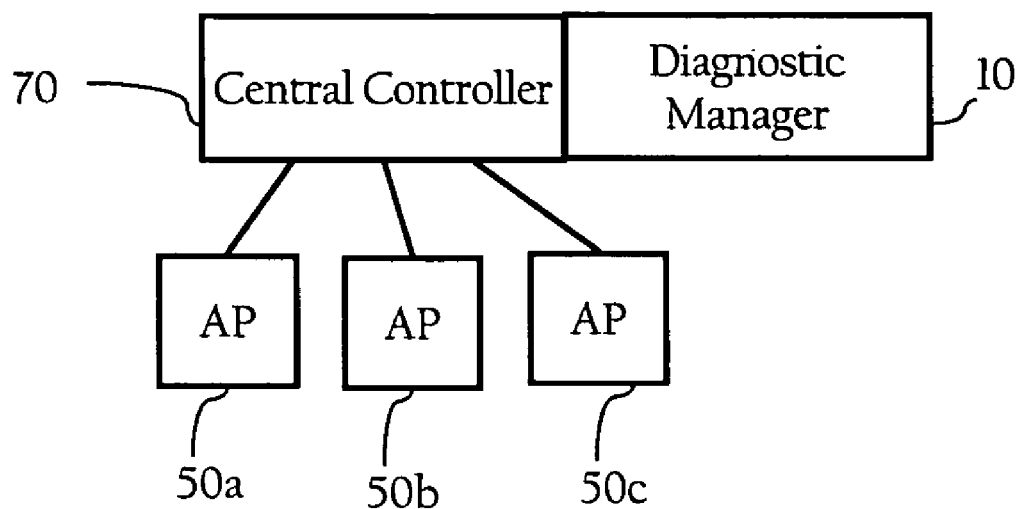
Fig._1B

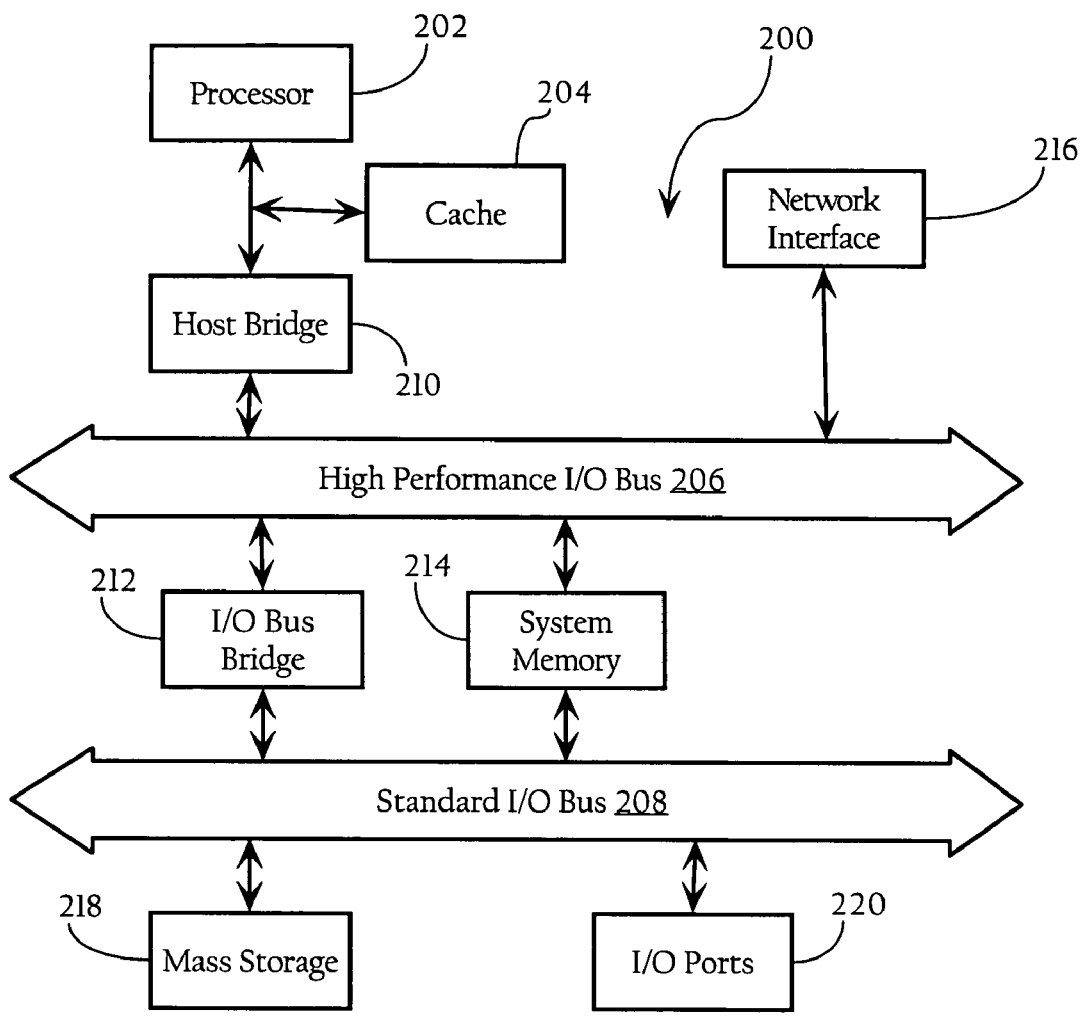
Fig._2

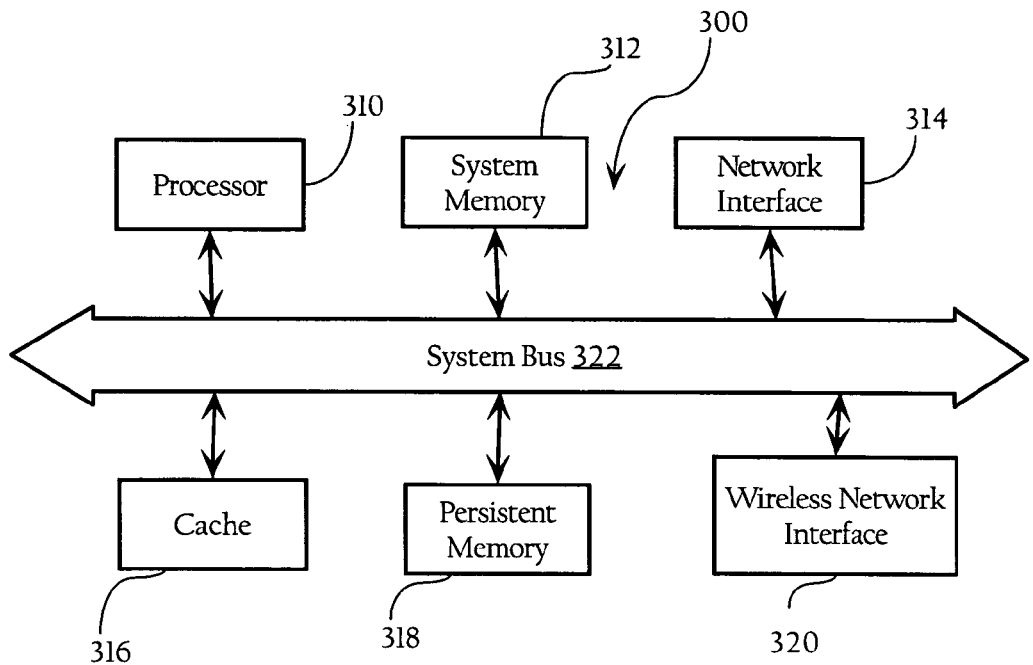
Fig._3

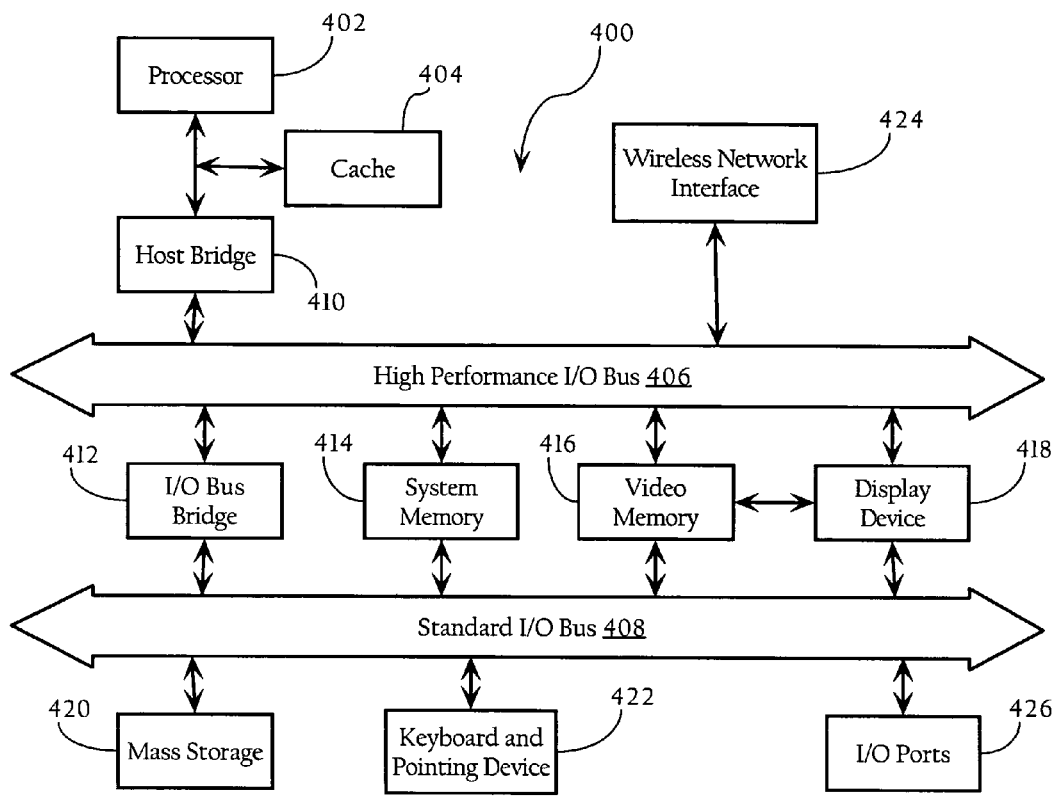
Fig._4

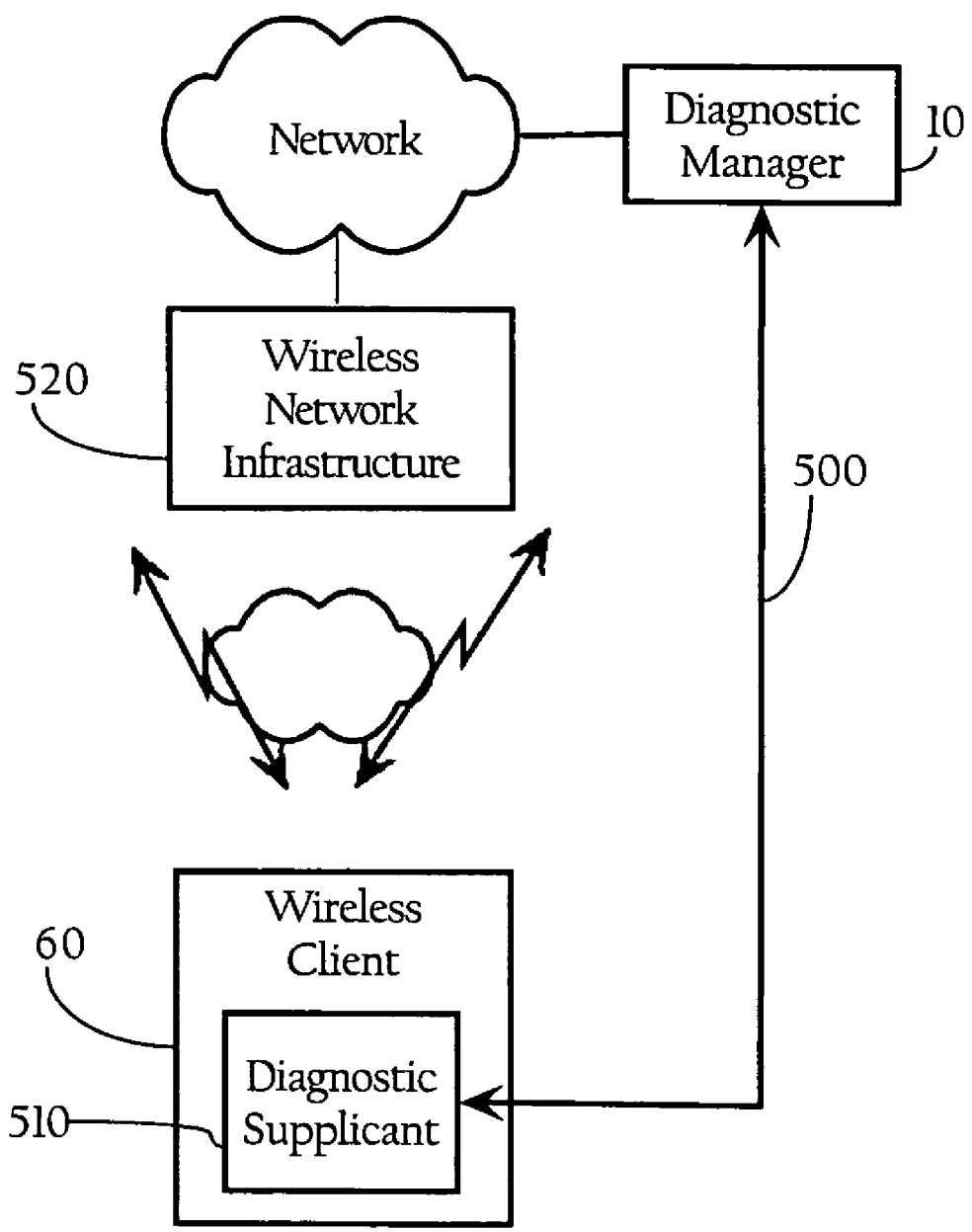
Fig._5

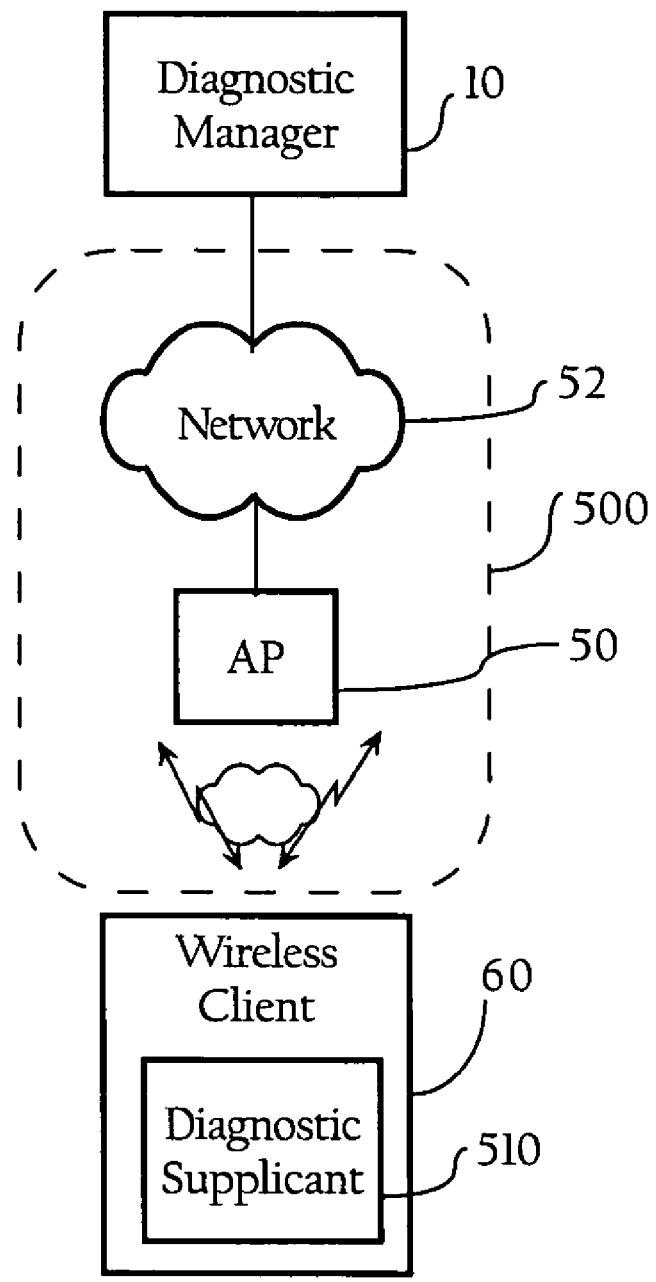
Fig._6A

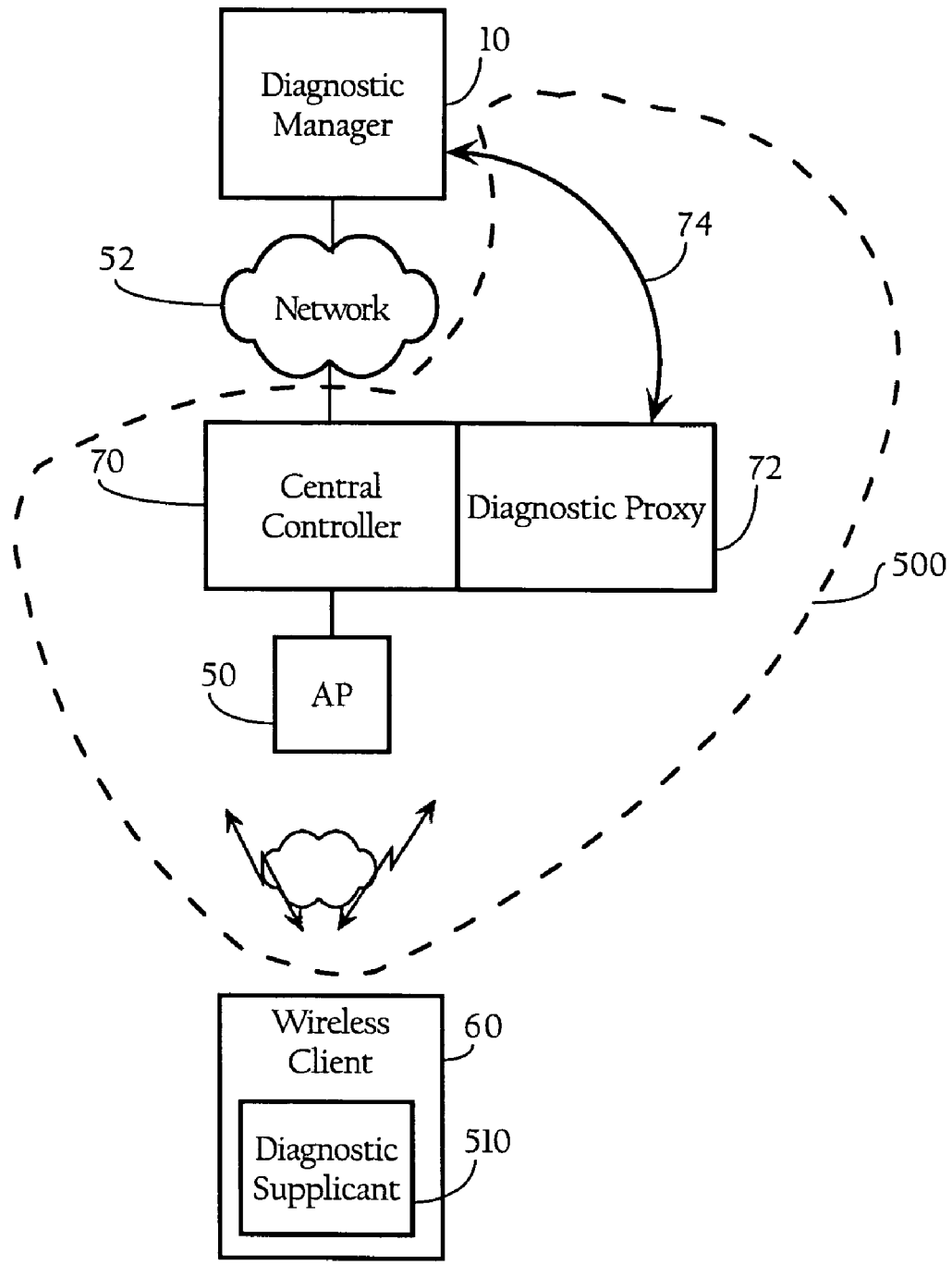
Fig._6B

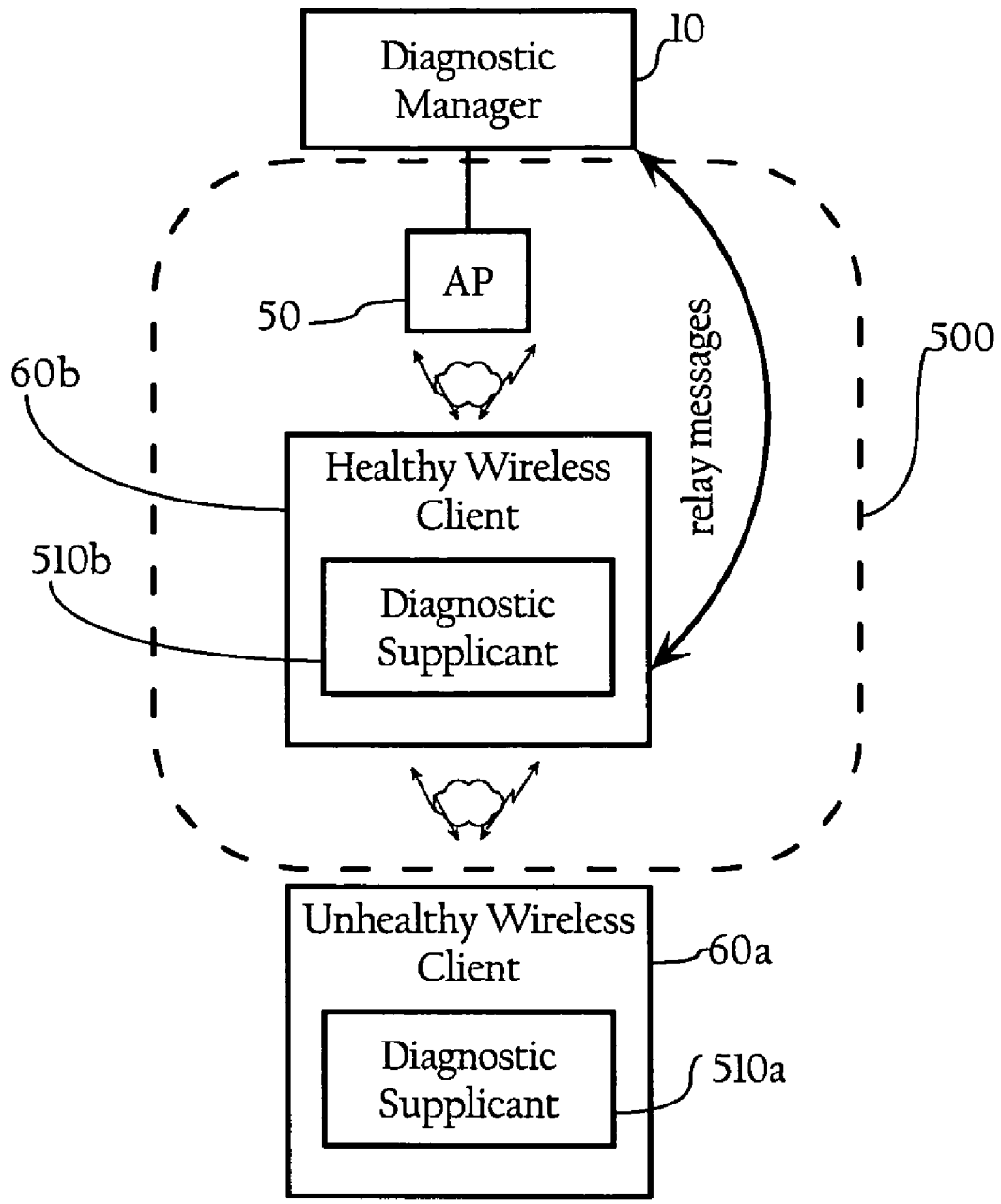
Fig._6C

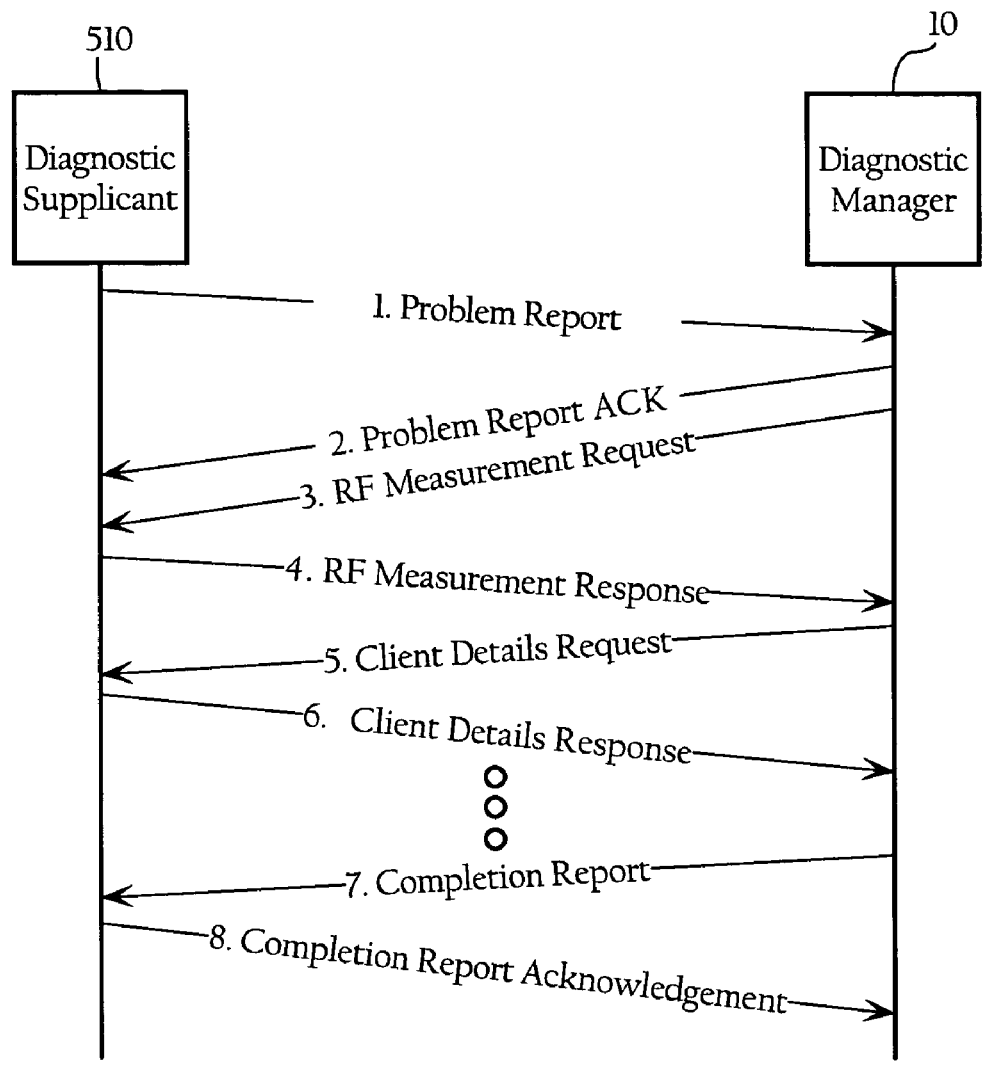
Fig._7

TROUBLESHOOTING LINK AND PROTOCOL IN A WIRELESS NETWORK

FIELD OF THE INVENTION

The present invention relates to wireless networks and, more particularly, to methods, apparatuses, and systems directed to facilitating troubleshooting in a wireless network.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

Connection reliability is critical for the overall health of a wireless network. When a connectivity problem arises, troubleshooting the problem can be difficult, given the number of potential causes of a loss of connectivity and/or the failure to initially establish network connectivity. In fact, troubleshooting a wireless connection often requires the involvement of a network administrator to diagnose the problem. In addition to connectivity problems, other potential problems may include authentication issues. Given the foregoing, a lay person is often unable to resolve the wireless connectivity issues without the assistance of a network administrator or other support staff. Accordingly, an enterprise is faced with the costs of providing troubleshooting support to ensure that end-user downtime is minimized.

In light of the foregoing, a need in the art exists for methods, apparatuses, and systems that address the foregoing problems and facilitate troubleshooting in a wireless network. Embodiments of the present invention substantially fulfill this need.

DESCRIPTION OF THE DRAWINGS

FIG. 1A is a topological diagram of the components in a wireless local area network (WLAN) system according to one implementation of the present invention.

FIG. 1B illustrates a diagnostic manager being implemented in a central controller, in accordance with one implementation of the present invention.

FIG. 2 illustrates for didactic purposes a hardware system, which may be used to implement a WLAN management server.

FIG. 3 illustrates for didactic purposes a hardware system, which may be used to implement a wireless access point.

FIG. 4 illustrates for didactic purposes a hardware system, which may be used to implement a wireless client.

FIG. 5 illustrates a wireless network implementing a diagnostic link between a wireless client and the diagnostic manager, according to one implementation of the present invention.

FIG. 6A illustrates a diagnostic link, according to one implementation of the present invention.

FIG. 6B illustrates a diagnostic link, according to another implementation of the present invention.

FIG. 6C illustrates a diagnostic link, according to another implementation of the present invention.

FIG. 7 is a diagram illustrating a possible information flow between a diagnostic supplicant and a diagnostic manager in accordance with one implementation of the present invention.

DESCRIPTION OF EXEMPLARY EMBODIMENT(S)

A. Overview

Figure 8A:
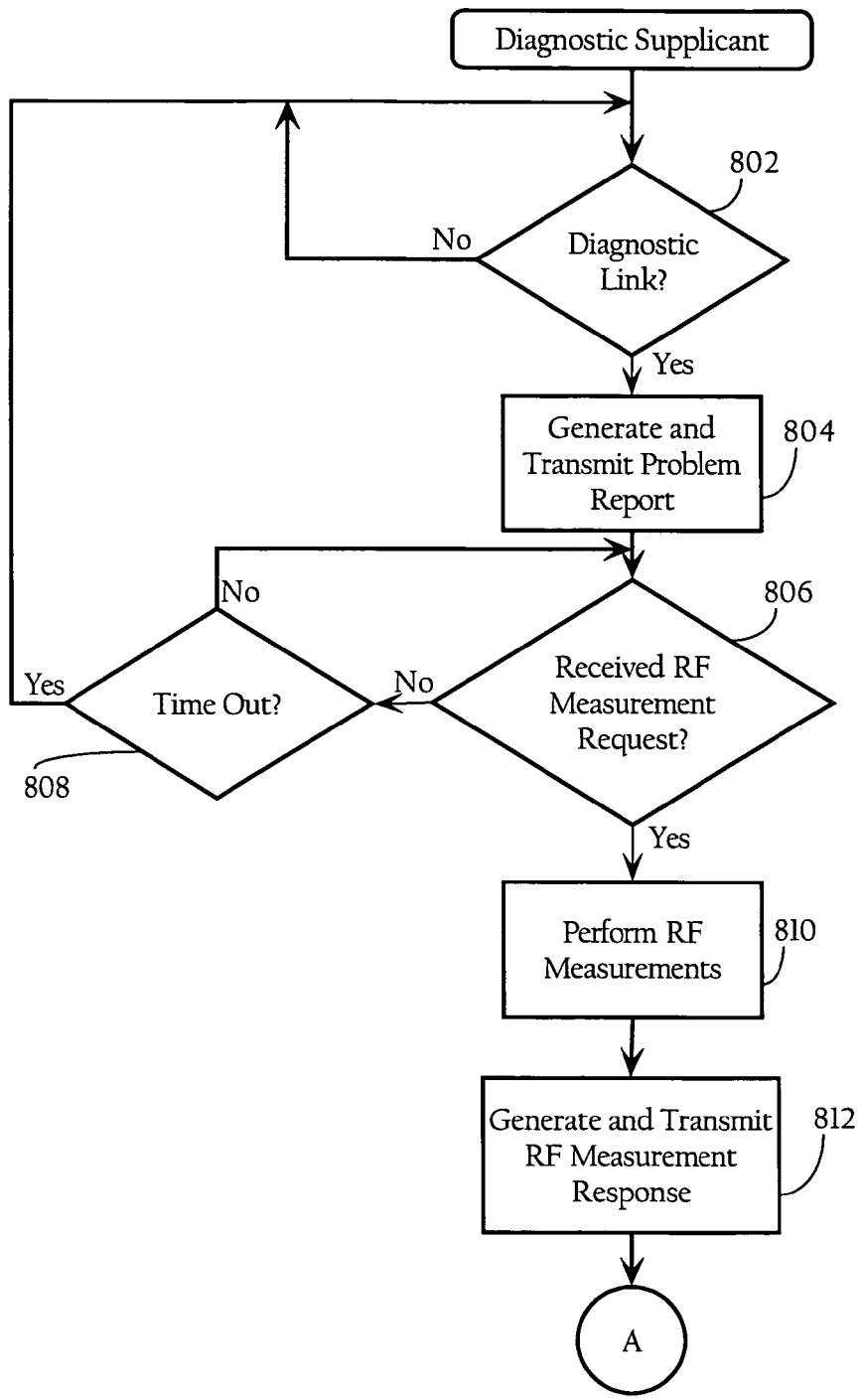
FIGS. 8A and 8B together are a flow chart illustrating a process flow, according to one implementation of the present invention, executed by the diagnostic supplicant in connection with performing a troubleshooting protocol.

The present invention provides methods, apparatuses, and systems directed to facilitating troubleshooting wireless connectivity issues in a wireless network. In accordance with the present invention, either a diagnostic supplicant in the wireless client, a diagnostic manager, or other suitable network element initiates a troubleshooting protocol between the diagnostic supplicant and the diagnostic manager over a diagnostic link in response to one or more events. As described in further detail below, the diagnostic link may be a wired connection, a physical RF channel, a multiplexed channel, an existing WLAN channel, a peer channel, and the like. In one implementation, after the diagnostic supplicant establishes a link to a diagnostic manager via a diagnostic link, the diagnostic supplicant generates and transmits a problem report to the diagnostic manager. As described in further detail below, the problem report initiates a troubleshooting protocol between the diagnostic manager and the diagnostic supplicant. In one implementation, the troubleshooting protocol may include one or more diagnostic tests generating information that is shared among the diagnostic manager, the diagnostic supplicant, and wireless access points of the wireless infrastructure. In one implementation, the diagnostic tests need not involve direct participation by the wireless client; for example, the network infrastructure may apply diagnostic tests and/or gather statistics based on the normal operations of the wireless client.

B. Exemplary Wireless Network System Architecture

B.1. Network Topology

A network environment including a wireless local area network (WLAN) according to one implementation of the present invention is shown in FIG. 1A. In a specific embodiment of the present invention, the system includes a diagnostic manager 10 running on a WLAN management server 20, an authentication server 22, a local area network (LAN) 30, a router 32, and wireless access points 50a, 50b, 50c, and 50d (collectively referred to as wireless access points 50). LAN 30 is implemented by a switch (or an array of switches) and/or other network devices, such as a bridge. In other implementations, other nodes in the WLAN may host the diagnostic manager 10.

As FIG. 1A illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between WLAN management server 20 and wireless access points 50. Of course, network 52 can include a variety of network segments, transmission technologies and components, such as terrestrial WAN links, satellite links, and cellular links. LAN 30 may be a LAN or LAN segments implemented by an Ethernet switch (not shown) or an array of switches having multiple ports to which wireless access points 50 are connected. The wireless access points 50 are typically connected to the switch ports via Ethernet links; however, other link layer connection protocols or communication means can be employed. FIG. 1A illustrates one possible network environment in which the invention may operate; however, other implementations are possible. For example, although WLAN management server 20 is illustrated as being on a different LAN or LAN segment, it may be co-located with wireless access points 50.

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification. The wireless access points 50 may be autonomous or so-called "fat" wireless access points, or light-weight wireless access points operating in connection with a wireless switch or controller in an environment involving hierarchical processing of protocol information. In addition, the network infrastructure may also include a Wireless LAN Solution Engine (WLSE) offered by Cisco Systems, Inc. of San Jose, Calif. or other wireless network management system. In one implementation, the wireless network management system may be implemented on a WLAN management server 20. Of course, configuration and management information can be obtained in a variety of manners without departing from the scope of the present invention.

B.2. Central Controller

While FIG. 1A illustrates one implementation in which the diagnostic manager 10 is implemented in the WLAN management server 20, in other implementations, the diagnostic manager 10 may be implemented in other nodes. FIG. 1B illustrates diagnostic manager 10 being implemented in a central controller 70, in accordance with one implementation of the present invention. In one implementation, the central controller 70 may be a wireless domain server (WDS) offered by Cisco Systems, Inc.(r) of San Jose, Calif. or, alternatively, as a wireless switch. If the central controller 70 is implemented as a WDS, the central controller 70 is operative to communicate with autonomous or so-called "fat" wireless access points. If the central controller 70 is implemented as a wireless switch, the central controller 70 is operative to communicate with light-weight wireless access points. Of course, other control points in the wireless network infrastructure can be used to enforce the pre-allocation policies described herein.

B.3. WLAN Management Server

FIG. 2 illustrates for didactic purposes a hardware system 200, which may be used to implement WLAN management server 20 of FIG. 1A or central controller 70 of FIG. 1B. In one implementation, hardware system 200 comprises a processor 202, a cache memory 204, and one or more software applications (including the diagnostic manager 10 shown in FIG. 1A) and drivers enabling the functions described herein. Additionally, hardware system 200 includes a high performance input/output (I/O) bus 206 and a standard I/O bus 208. A host bridge 210 couples processor 202 to high performance I/O bus 206, whereas I/O a bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 perform their conventional functions known in the art. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures, and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist with the components of hardware system 200 being coupled to the single bus. Furthermore, hardware system 200 may include additional components, such as additional processors, storage devices, or memories.

As discussed above, in one embodiment, the operations of the WLAN management server 20 described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other conventional operating systems, such as the Apple Macintosh Operating System, available from Apple Computer Inc. of Cupertino, Calif., UNIX operating systems, LINUX operating systems, and the like.

B.4. Wireless Access Point

FIG. 3 illustrates for didactic purposes a hardware system 300, which may be used to implement a wireless access point

50 of FIGS. 1A or 1B. In one implementation, the wireless access point 300 comprises a processor 310, a memory 312, a network interface 314 (e.g., an 802.3 interface) for communication with a LAN, a cache 316 for storing VLAN information, a persistent memory 318, a wireless network interface 320 (e.g., an IEEE 802.11 WLAN interface) for wireless communication with one or more wireless clients 60, and a system bus 322 interconnecting these components. The wireless access points 50 may also include software modules (including Dynamic Host Configuration Protocol (DHCP) clients, Cisco® Discovery Protocol (CDP) modules, wireless access point modules, Simple Network Management Protocol (SNMP) functionality, etc.) and device drivers (e.g., network and WLAN interface drivers) stored in persistent memory 318 (e.g., a hard disk drive, flash memory, etc.). At start up, these software components are loaded into system memory 312 and then accessed and executed by processor 310.

B.5. Wireless Client

FIG. 4 illustrates for didactic purposes a hardware system 400, which may be used to implement a wireless client 60 of FIG. 1A. In one embodiment, hardware system 400 includes a processor 402 and a cache memory 404 coupled to each other as shown. Additionally, hardware system 400 includes a high performance input/output (I/O) bus 406 and a standard I/O bus 408. A host bridge 410 couples processor 402 to high performance I/O bus 406, whereas an I/O bus bridge 412 couples the two buses 406 and 408 to each other. A wireless network interface 424, a system memory 414, and a video memory 416 couple to bus 406. In turn, a display device 418 couples to video memory 416. A mass storage 420, a keyboard and pointing device 422, and I/O ports 426 couple to bus 408. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 400 perform their conventional functions known in the art. In particular, wireless network interface 424 provides communication between hardware system 400 and any of a wide range of wireless networks, such as a WLAN (e.g., IEEE 802.11), etc. Mass storage 420 provides permanent storage for the data and programming instructions to perform the above described functions implemented in the system controller, whereas system memory 414 (e.g., DRAM) is used to provide temporary storage for the data and programming instructions when executed by processor 402. I/O ports 426 are one or more serial and/or parallel communication ports that provide communication between additional peripheral devices, which may couple to hardware system 400.

Hardware system 400 may include a variety of system architectures; and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain implementations of the present invention may not require nor include all of the above components. For example, the peripheral devices shown coupled to standard I/O bus 408 may couple to high performance I/O bus 406. In addition, in some implementations only a single bus may exist with the components of hardware system 400 being coupled to the single bus. Furthermore, hardware system 400 may include additional components, such as additional processors, storage devices, or memories.

In one embodiment, the operations of wireless client-side diagnostic supplicant functionality are implemented as a series of software routines run by hardware system 400. These software routines, which can be embodied in a wireless network interface driver, comprise a plurality or series of instructions to be executed by a processor in a hardware system, such as processor 402. Initially, the series of instructions are stored on a storage device, such as mass storage 420. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 424. The instructions are copied from the storage device, such as mass storage 420, into memory 414 and then accessed and executed by processor 402. In alternate embodiments, the present invention is implemented in discrete hardware or firmware.

While FIG. 4 illustrates, for didactic purposes, the hardware architecture of a wireless client according to one implementation of the present invention, the present invention, however, can be implemented on a wide variety of computer system architectures, such as dual-mode cellular phones, wireless VoIP phones, Personal Digital Assistants, Laptop computers, and the like. An operating system manages and controls the operation of hardware system 400, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system, available from Microsoft Corporation of Redmond, Wash. However, the present invention may be used with other conventional operating systems, such as the Apple Macintosh Operating System, available from Apple Computer Inc. of Cupertino, Calif., UNIX operating systems, LINUX operating systems, and the like.

C. Wireless Network Environment and Diagnostic Link

C.1. Diagnostic Link

As described above, the diagnostic supplicant, the diagnostic manager, or other suitable network element may initiate a troubleshooting protocol between the diagnostic supplicant 510 and the diagnostic manager 10 over a diagnostic link 500 in response to one or more events. Events that may trigger the troubleshooting protocol may take a variety of forms. For example, the trigger may be an explicit command from a user application on the wireless client or an automatic trigger after the wireless client fails to establish connectivity with the wireless network. The failure can be recognized when, for example, the diagnostic supplicant observes a threshold number of failed events or dropped packets, etc. In other implementations, the event may be an explicit command issued by a network administrator using a management console. As discussed in more detail below, the diagnostic link 500, in one implementation, is a prioritized, dedicated channel with low to zero traffic to help isolate and troubleshoot wireless connectivity problems and generate debugging information from the wireless client and from the wireless network infrastructure for analysis by the diagnostic manager. In one implementation, the diagnostic tests need not involve direct participation by the wireless client; for example, the network infrastructure may apply diagnostic tests and/or gather statistics based on the normal operations of the wireless client.

FIG. 5 illustrates a wireless network infrastructure supporting a diagnostic link 500 between a diagnostic supplicant 510 on a wireless client 60 and the diagnostic manager 10, according to one implementation of the present invention. Under normal operating conditions, the wireless client 60 may access the wireless infrastructure 520 according to standard mechanisms. However, an event, as described above, may trigger the diagnostic supplicant 510 and the diagnostic manager 10 to establish a diagnostic link 500 and initiate a troubleshooting protocol.

The diagnostic link 500 may be implemented in several forms. For example, the diagnostic link may be implemented as a physical channel or a logical channel. In one possible physical channel implementation, a network administrator may configure a select set of dedicated resources such as one or more dedicated wireless access points to operate on a selected channel or set of channels. In one implementation, the dedicated wireless access points may advertise a "SOS" or troubleshooting SSID in beacon or other wireless management frames. In a logical channel implementation, a network administrator may configure an additional SSID on the current respective operating channel of all (or a selected subset of) wireless access points in the wireless network infrastructure. In one such implementation, the diagnostic channel has its own virtual BSSID on the wireless access points. Furthermore, in either the physical or logical implementation, the RF attributes of the diagnostic channel can be configured with higher power and lower data rates in an attempt to overcome or alleviate any potential RF issues associated with the WLAN. It is understood that throughput on the diagnostic channel is generally not a concern. Traffic on the diagnostic channel may be rate limited to eliminate or mitigate any possible DoS (Denial of Service) attacks using the channel. In one implementation, to remove authentication issues, the diagnostic link or channel may provide for open authentication. In one such implementation, the network infrastructure is configured to provide no additional network access outside of troubleshooting. For example, in one implementation, this can be accomplished by establishing a DMZ VLAN with no other network or internet access. The diagnostic link may be established in other forms as well. For example, the diagnostic link may be implemented using a wired connection (such as a wireless client being directly connected to a dedicated Ethernet switch port of the network infrastructure (i.e., a multiple homed host in Internet vernacular). Using a wired connection may be used for cases where wireless connectivity or interference is the problem. Still further, the diagnostic link may be effected using an ad hoc connection with a peer wireless client.

In accordance with the present invention, the diagnostic link, whether logical or physical, is configured to ensure, or at least increase the possibility, that the diagnostic supplicant can establish a link to the diagnostic manager. Embodiments of the present invention take various actions to ensure a connection. For example, the diagnostic link may be configured such that coverage is guaranteed by transmitting at very high power and only supporting very low data rates. With limited traffic and interference on this low-rate channel, RF problems should be removed or reduced as a cause of wireless connectivity issues. To remove any authentication issues, the diagnostic channel may, in one implementation, provide open authentication. For security reasons, once the diagnostic supplicant is connected to the diagnostic manager over the diagnostic link, the diagnostic supplicant may be limited to communicating with the diagnostic manager for troubleshooting purposes.

As shown above, implementations of the present invention take advantage of the multi-channel capabilities of the 802.11 a/b/g standards to provide the diagnostic link for troubleshooting purposes. Regulations in various countries such as the U.S., Spain, Japan, Canada, etc. allow different channels and channel configurations to be used. Because channel interference may be different from deployment to deployment, the network administrator may, in one implementation, select a RF channel for a given deployment.

FIGS. 6A and 6B are implementations that support physical and logical channels, existing WLAN channels, and wired connections, as described above. FIG. 6A illustrates the diagnostic link 500, according to one implementation of the present invention, where the diagnostic link 500 couples the wireless client 60 to the diagnostic manager 10 via a wireless access point 50 and a network 52. FIG. 6B illustrates the diagnostic link 500, according to another implementation of the present invention, where the diagnostic link 500 couples the wireless client 60 to the diagnostic manager 10 via a wireless access point 50, a central controller 70, and a diagnostic proxy 72. In one implementation, the diagnostic proxy 72 and the diagnostic manager 10 establish a communications tunnel 74 (encapsulating packets transmitted between the diagnostic supplicant 510 and the diagnostic manager).

FIG. 6C illustrates the diagnostic link 500, according to another implementation of the present invention, where the diagnostic link 500 couples the wireless client 60a (an unhealthy wireless client) to the diagnostic manager 10 via a peer wireless client 60b (e.g., a healthy wireless client) and wireless access point 50. FIG. 6C illustrates a peer-to-peer configuration where the diagnostic supplicant 510a of the wireless client 60a discovers the diagnostic supplicant 510b of the wireless client 60b. Once the diagnostic supplicants 510a and 510b are in communication, the diagnostic supplicant 510b may relay messages between the diagnostic supplicant 510a and the diagnostic manager 10.

C.2. Identification of Diagnostic Link

When the wireless client 60 has problems accessing the wireless network infrastructure, the diagnostic supplicant 510 may locate the diagnostic link 500 in a number of ways. In one implementation the diagnostic manager advertises the availability of the diagnostic link continuously. In one implementation the diagnostic manager advertises the availability of the diagnostic link on demand when requested by the wireless client. In one implementation, a wireless client may be pre-configured with connection information (e.g., a "SOS" SSID) of the diagnostic link. In another implementation, the connection information of the diagnostic link and/or one or more parameters of the diagnostic link are advertised in beacon or other wireless network management frames. In a wired connection implementation, the beacon frame can include the location of the physical Ethernet switch port dedicated to the diagnostic link. The wireless network infrastructure may alternatively provide one or more parameters such as an SSID, a BSSID, time stamps, or an IP address via probe responses.

D. Troubleshooting Protocol

The following describes a troubleshooting protocol according to one implementation of the present invention. As described in further detail below, the troubleshooting protocol, in one implementation, involves information that is generated by the diagnostic manager, the diagnostic supplicant, and/or various elements of the wireless network infrastructure (e.g., wireless access points, authentication servers, etc.).

Figure 8B:
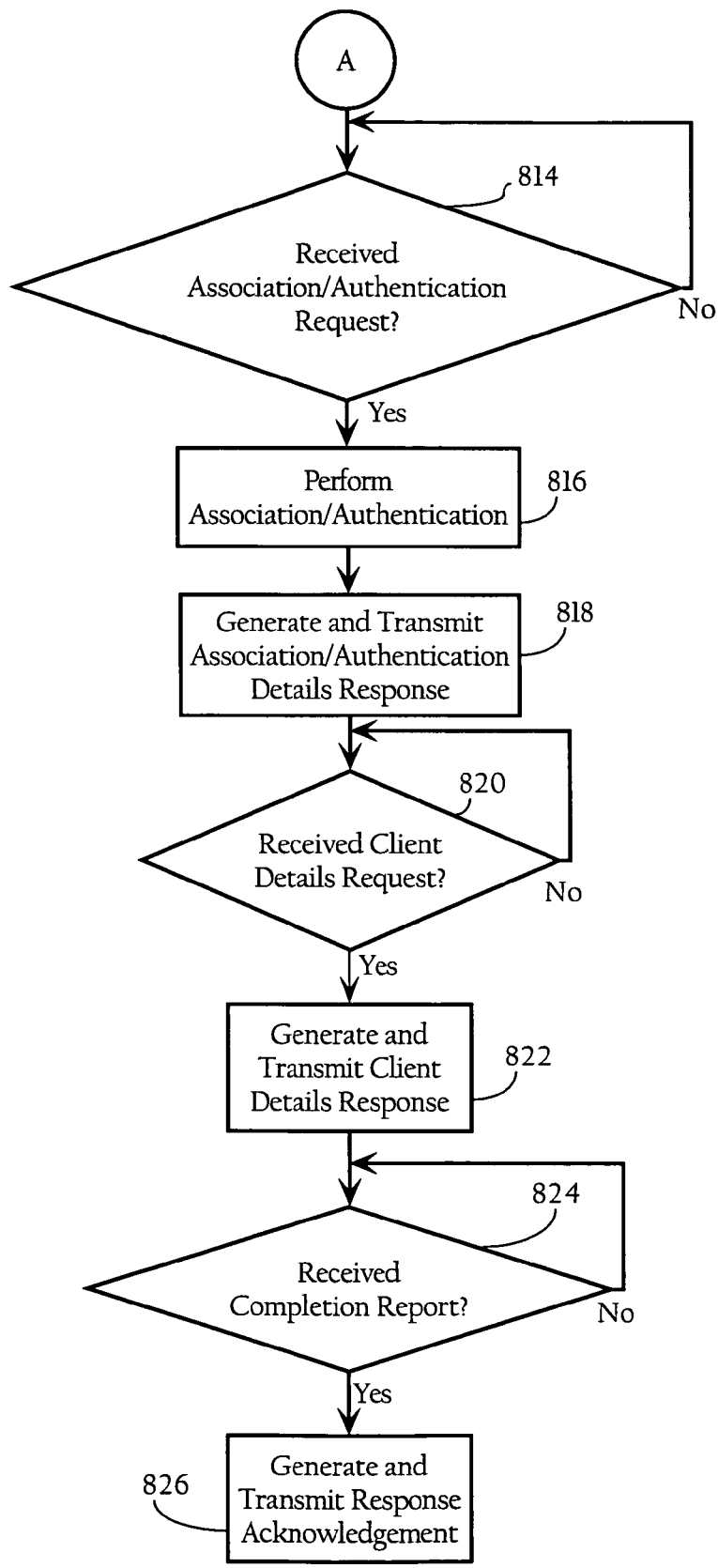

FIG. 7 is a diagram illustrating a possible information flow between the diagnostic supplicant 510 and the diagnostic manager 10 in accordance with one implementation of the present invention. FIGS. 8A and 8B together are a flow chart illustrating a process flow, according to one implementation of the present invention, executed by the diagnostic supplicant 510 in connection with performing a troubleshooting protocol. Referring to FIGS. 7, 8A, and 8B together, the diagnostic supplicant 510 first establishes a link with the diagnostic manager 10 via the diagnostic link 500 (802) (FIG. 8A). In one implementation, the diagnostic supplicant may operate in a background process to associate with, or pre-allocate resources on, one or more access points that implement the diagnostic link. In such an embodiment, the diagnostic supplicant simply checks whether a diagnostic link is enabled before initiating a diagnostic protocol session. In another implementation, the diagnostic link is established on demand. After the diagnostic link is established (e.g., via a wired connection or an open association on a WLAN Diagnostic Channel), the diagnostic supplicant 510 generates and transmits a problem report to the diagnostic manager 10 (804), which, in one implementation, transmits an acknowledgement. In one implementation, the problem report may be an initial diagnostic report that indicates the type of problem that the wireless client experienced. Problems may involve, for example, RF issues, connectivity issues, authentication issues, association issues, etc. In one implementation, the diagnostic supplicant 510 may continuously collect and store RF measurements, as well as other connection state information, in detailed logs. Some or all of the information in these logs may be included in the problem report. In addition, the problem report may include a problem type identifier corresponding to a problem detected by the diagnostic supplicant. In addition, the diagnostic supplicant 510 may access the MIB, if any, on the wireless client to gather any relevant statistics to be included in the problem report. The diagnostic supplicant 510 then waits for a responsive message or command from the diagnostic manager 10.

As FIG. 8 illustrates, the diagnostic supplicant 510, in one implementation, determines if it has received a radio frequency (RF) measurement request (806). If not, the diagnostic supplicant 510 determines if there has been a time out (808). If diagnostic supplicant 510 receives an RF measurement request, the diagnostic supplicant 510 performs RF measurements (810) and transmits an RF response containing the RF measurements to the diagnostic manager (812). RF measurements include signal attribute information, such as received signal strength, signal to noise ratio, interference and noise. For example, in one implementation, RF measurements may include link tests, which may include scanning the coverage area for wireless frames on one or more RF channels, determining the receive signal strength of the wireless frames and storing the source MAC address of the received wireless frame in association with a detected receive signal strength value and a RF channel identifier. Signal attribute information may include Signal to Noise Ratio (SNR) and interference. Other RF measurement operations may involve the transmission of one or more wireless frames to allow one or more infrastructure access points to possibly detect the wireless frames and report them to the diagnostic manager. Still further, other RF measurement operations can include the transmission of probe request frames to one or more wireless access points and the receipt of corresponding probe responses, including the detection of one or more receive signal attributes. A variety of RF measurement operations involving the transmission and/or receipt of wireless frames and the gathering of signal data can be used to collect information relevant to channel noise, channel load, path loss information, jitter, packet loss and the like. As FIG. 8 illustrates, after the wireless client performs one or more RF measurement operations, it generates and transmits an RF measurement response including information gathered or detected during the one or more RF measurements.

The diagnostic supplicant 510 then determines if it has received an association/authentication request (814) (FIG. 8B) from the diagnostic manager to attempt association/authentication on the WLAN which is under diagnosis. The wireless client then attempts an association and authentication with the WLAN using normal mechanisms (816). Accordingly, in one implementation, the wireless client attempts to associate with the WLAN and to authenticate with a RADIUS or other authentication server of the WLAN. The diagnostic supplicant can then, in one implementation, generate and transmit an association/authentication details response (818) to report back via the diagnostic channel any details it learns, such as the MAC address of the wireless access point with which the wireless client tried to associate and the results. As described in more detail below, in one implementation, execution of the association and authentication test may be conditioned on whether or not the wireless client sees any infrastructure wireless access points during the RF measurement measurements.

The diagnostic supplicant 510 then determines if it has received a client details request (820). If so, the diagnostic supplicant 510 generates and transmits a client details response to the diagnostic manager 10 (822). Client details describe what the wireless client is and its capabilities and configuration. For example, in one implementation, client details may include wireless client identification, wireless client MAC, wireless client IP address information, product and vendor information, network interface card (NIC) type, operating system details, driver version details, WEP keys, etc. The client details may be useful for the diagnostic manager to determine if the wireless connectivity issue is due to a configuration issue. The diagnostic supplicant 510 determines if it has received a completion report from the diagnostic manager 10 (824). If so, the diagnostic supplicant 510 transmits an acknowledgment response to the diagnostic manager 10 (826).

Figure 9:
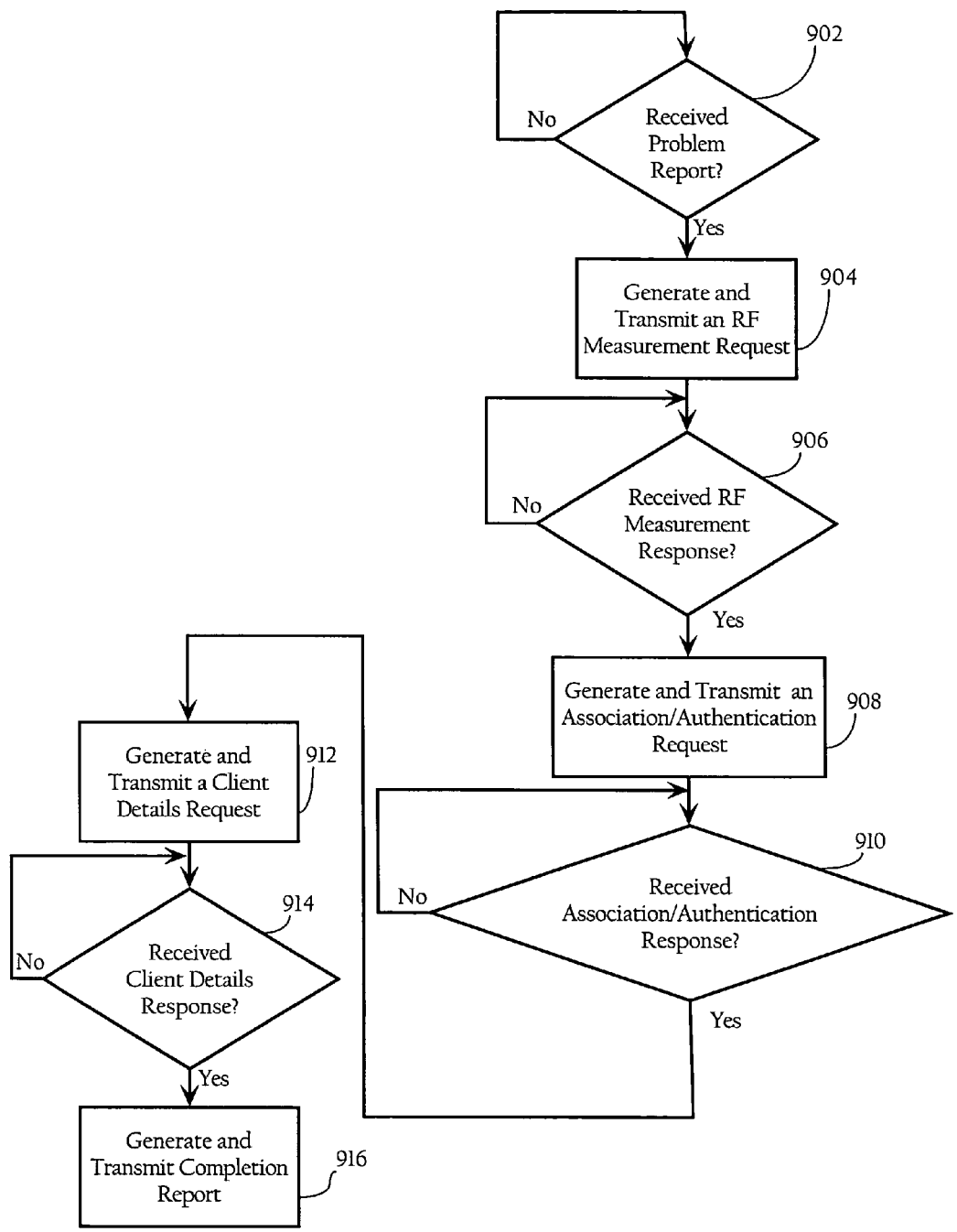
FIG. 9 is a flow chart illustrating a process flow, according to one implementation of the present invention, executed by the diagnostic manager in connection with performing the troubleshooting protocol.

FIG. 9 is a flow chart illustrating a process flow, according to one implementation of the present invention, executed by the diagnostic manager 10 in connection with performing the troubleshooting protocol described above in FIG. 8. As FIG. 9 illustrates, the diagnostic manager 10 determines if it has received a problem report from the diagnostic supplicant 510. If so, the diagnostic manager 10 generates and transmits an RF measurement request (904). As described above, RF measurements include signal attribute information (e.g., signal strength, SNR, etc.). The RF measurement request may trigger commands to the wireless network infrastructure including wireless access points. In one implementation, such commands may include, for example, link tests, association tests, and authentication tests, dynamic host configuration protocol (DHCP) tests, Domain Name System (DNS) tests, Authentication Authorization and Account (AAA) tests, etc. In one implementation, such commands may include, for example dynamic host configuration protocol (DHCP) tests, Domain Name System (DNS) tests, Authentication Authorization and Account (AAA) tests which determine if these servers are both reachable (i.e., ICMP Echo Request) and can correctly provide a valid response to the diagnostic client's test message. In one implementation, the commands may include requests for RF measurements, which may include, for example, operational parameters, network settings on the wireless client, channel load, channel noise, location information, path loss information, signal strength, packet loss, jitter, co-channel interference, associations with the wireless access points, ping (ICMP Echo Request) and other connection results, etc. The diagnostic manager 10 then determines if it has received an RF measurement response from the diagnostic supplicant (906) or other results from the wireless infrastructure in connection with the RF measurement request.

The diagnostic manager 10 then generates and transmits an association/authentication request (908). In the association/authentication request, in one implementation, the request instructs the wireless client to attempt an association with the wireless network infrastructure and authentication with a RADIUS or other authentication server. The diagnostic manager 10 then determines if it has received an association/authentication response (910) from with one or more nodes of the WLAN infrastructure to determine what events are generated there (e.g., a successful association, but an unsuccessful authentication, etc.) and from the diagnostic supplicant to determine any details the wireless client has learned (e.g., the MAC address of the wireless access point with which the wireless client tried to associate and the results). In one implementation, the diagnostic manager 10 causes the wireless client to execute one or more network tests and to report the results of the network tests back to the diagnostic manager 10. In one implementation, the network tests may include one or more of dynamic host configuration protocol (DHCP) tests, Domain Name System (DNS) tests, Authentication Authorization and Account (AAA). The diagnostic manager can use the information from the wireless client, as well as information gathered from the wireless access point and the authentication server to help diagnose the problem. In one implementation, the association/authentication test may be conditioned on whether or not the wireless client sees any infrastructure wireless access points during the RF measurement tests, and if so, the diagnostic manager could select one of the wireless access points the wireless client sees and direct the wireless client to associate with the wireless access point.

The diagnostic manager 10 then generates and transmits a client details request (908). As described above, client details describe what the wireless client is and its capabilities and configuration (e.g., wireless client identification, wireless client MAC, wireless client IP address information, etc.). The diagnostic manager 10 then determines if it has received a client details response from the diagnostic supplicant 510 (914). If so, the diagnostic manager 10 generates and transmits a completion report to the diagnostic supplicant 510 (916). In one implementation, the completion report may provide results from the troubleshooting protocol or may display a message or list containing recommendations for a network administrator if the problem requires human intervention. For example, in one implementation, a recommendation may be to adjust one or more operational parameters of the WLAN. In one implementation, another recommendation may be for the user to configure items such as network settings or operation system settings outside of a wireless adapter. Another recommendation may be for the user to contact a help desk via a phone number or website. In one implementation, the diagnostic manager may automatically initiate remedial measures, which may include automatically provisioning or automatically reconfiguring aspects of the wireless network infrastructure. In one implementation, the diagnostic manager may advertise WLAN settings and/or provision configuration parameters for new and existing wireless clients. In one implementation, the diagnostic supplicant can be configured to automatically configure one or more operational parameters of the wireless network interface.

According to the methods, apparatuses, and systems disclosed herein, the present invention provides numerous benefits. For example, the present invention provides a more reliable RF connection for automatic initial configuration and for automatically diagnosing and troubleshooting WLAN connectivity issues, enables the wireless client and various elements of the wireless network infrastructure to automatically collect network information and detailed logs, provides a means for automatic remedial measures to successfully establish a functional connection between a wireless client and the WLAN, provides a means for a wireless client to display network troubleshooting results for a network administrator, and provides a mechanism to provide parameters for new and existing wireless clients.

The present invention has been explained with reference to specific embodiments. For example, while embodiments of the present invention have been described as operating in connection with IEEE 802.11 networks, the present invention can be used in connection with any WLAN environment. Other embodiments will be evident to those of ordinary skill in the art. It is therefore not intended that the present invention be limited, except as indicated by the appended claims.

What is claimed is:

1. A wireless client, comprising:
   one or more processors;
   a memory;
   a network interface;
   a diagnostic supplicant application, physically stored in the memory, comprising instructions operable to cause the one or more processors and the wireless client to:
      responsive to a failure to establish a wireless connection with a wireless network, identify a diagnostic link to a diagnostic manager based on access information transmitted by a wireless access point in one or more wireless frames advertising the availability of the diagnostic link, wherein the diagnostic link is a communications link supported by a network access node and dedicated to exchange of diagnostic information between diagnostic supplicants and diagnostic managers;
      establish, using the transmitted access information, a diagnostic link connection to the network access node; and
      exchange diagnostic information with the diagnostic manager through the network access node over the diagnostic link, wherein the diagnostic information relates to the wireless connection with the wireless network.

2. The wireless client of claim 1 wherein the diagnostic supplicant application further comprises instructions operable to cause the one or more processors and the wireless client to:
   collect radio frequency (RF) measurement data in response to an RF measurement data request from the diagnostic manager; and
   transmit the RF measurement data to the diagnostic manager.

3. The wireless client of claim 1 wherein the diagnostic supplicant application further comprises instructions operable to cause the one or more processors and the wireless client to:
   gather network data during execution of a diagnostic protocol.

4. The wireless client of claim 1 wherein the diagnostic supplicant application further comprises instructions operable to cause the one or more processors and the wireless client to:
   perform one or more diagnostic tests.

5. The wireless client of claim 1 wherein the diagnostic supplicant application further comprises instructions operable to cause the one or more processors and the wireless client to:
   generate a problem report; and
   transmit the problem report to the diagnostic manager.

6. The wireless client of claim 1 wherein the diagnostic supplicant application further comprises instructions operable to cause the one or more processors and the wireless client to:
   transmit client detail data in response to client detail request from the diagnostic manager.

7. The wireless client of claim 1 wherein the diagnostic link is implemented as at least one of a wired connection, a physical channel, a multiplex channel, an existing wireless local area network (WLAN) channel, and a peer channel.

8. The wireless client of claim 1 wherein the diagnostic link is implemented across at least the following nodes:
   a peer wireless client; and
   a wireless access point operative to communicate with a second wireless client.

9. In a wireless client, a method comprising:
   attempting to establish a wireless connection with a wireless network;
   responsive to a failure to establish the wireless connection, identifying a diagnostic link to a diagnostic manager based on access information transmitted by a wireless access point in one or more wireless frames advertising the availability of the diagnostic link, wherein the diagnostic link is a communications link supported by a network access node and dedicated to exchange of diagnostic information between diagnostic supplicants and diagnostic managers;
   establishing, at the wireless client, a diagnostic link connection network access node, using the transmitted access information, ; and
   exchanging diagnostic information with the diagnostic manager through the network access node over the diagnostic link, wherein the diagnostic information relates to the wireless connection.

10. The method of claim 9 further comprising:
   collecting radio frequency (RF) measurement data in response to an RF measurement data request from the diagnostic manager; and
   transmitting the RF measurement data to the diagnostic manager.

11. The method of claim 9 further comprising gathering network data during execution of a diagnostic protocol.

12. The method of claim 9 further comprising perform one or more diagnostic tests.

13. The method of claim 9 further comprising:
   generating a problem report; and
   transmitting the problem report to the diagnostic manager.

14. The method of claim 9 further comprising transmitting client detail data in response to client detail request from the diagnostic manager.

15. The method of claim 9 wherein the diagnostic link is implemented as at least one of a wired connection, a physical channel, a multiplex channel, an existing wireless local area network (WLAN) channel, and a peer channel.

16. The method of claim 9 wherein the diagnostic link is implemented across at least the following nodes:
   a peer wireless client; and
   a wireless access point operative to communicate with a second wireless client.

17. A wireless client comprising:
   means for identifying a diagnostic link to a diagnostic manager based on access information transmitted by a wireless access point in one or more wireless frames advertising the availability of the diagnostic link, wherein the diagnostic link is a communications link supported by a network access node and dedicated to exchange of diagnostic information between diagnostic supplicants and diagnostic managers;
   means for establishing a wireless connection with a wireless network;
   means for establishing, using the transmitted access information, a diagnostic link connection to the network access node ; and
   means for exchanging diagnostic information relating to the wireless connection with the diagnostic manager through the network access node over the diagnostic link.

* * * * *